United States Patent [19]

Kiener

[11] 4,046,433

[45] Sept. 6, 1977

[54] WHEEL BEARING UNIT FOR MOTOR VEHICLES

[75] Inventor: Heinz Kiener, Waigolshausen, Germany

[73] Assignee: SKF Industries, Inc., King of Prussia, Pa.

[21] Appl. No.: 668,870

[22] Filed: Mar. 22, 1976

[30] Foreign Application Priority Data

Mar. 22, 1975 Germany ............................ 2512827

[51] Int. Cl.[2] ............................................. F16C 33/00

[52] U.S. Cl. .................................. 308/191; 301/126; 301/135; 308/210

[58] Field of Search ....................... 301/126, 135, 132; 308/191, 210

[56] References Cited

U.S. PATENT DOCUMENTS

| | | | |
|---|---|---|---|
| 721,700 | 3/1903 | Hartney | 308/191 |
| 2,037,982 | 4/1936 | Hughes | 308/210 |
| 2,081,566 | 5/1937 | Winkler | 308/191 |

*Primary Examiner*—Richard A. Bertsch
*Attorney, Agent, or Firm*—Daniel M. Rosen

[57] ABSTRACT

A wheel bearing unit for motor vehicles with at least two bearing parts which can turn relative to one another, between which at least two rows of roll bodies are arranged. The bearing parts each have an outer portion, the first of said outer portions being fastened to the vehicle, the other to the wheel. The fastening is effected by mating threads axially aligned between one outer portion and a connecting part. Means are provided for securing the mated threaded portions against relative loosening rotation.

8 Claims, 1 Drawing Figure

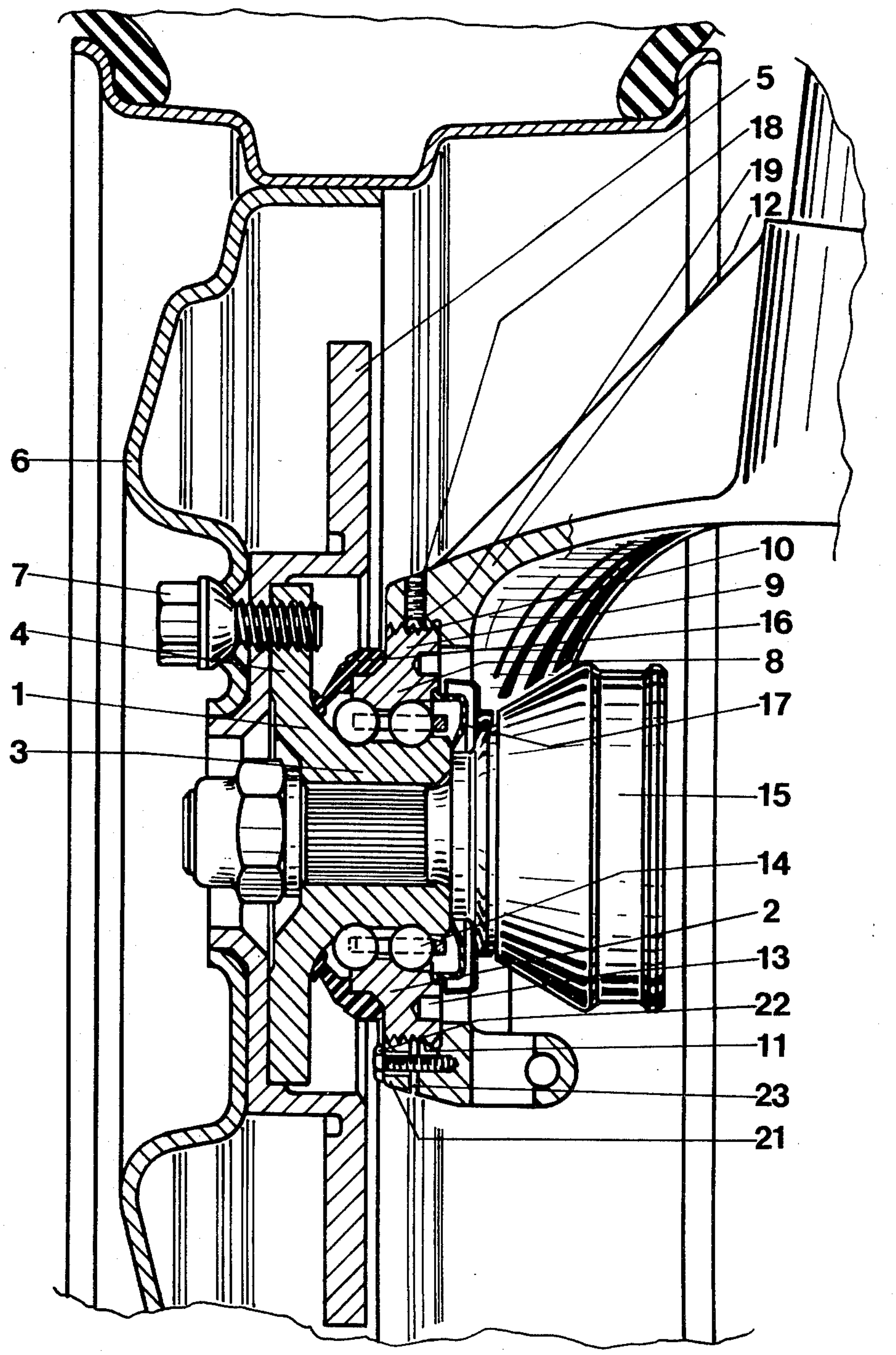
5
18
19
12
6
10
7
9
4
16
8
1
17
3
15
14
2
13
22
11
23
21

WHEEL BEARING UNIT FOR MOTOR VEHICLES

BACKGROUND OF THE INVENTION

The invention relates generally to a wheel bearing unit for motor vehicles and particularly to bearing units having at least two bearing parts which can rotate relative to one another and between which at least two roll body rows are arranged. The bearing parts each have an outer part, one part being fastened to the vehicle, the wheel and a brake disk being fastened to the other. Such bearing units are generally known, as for example from the publication "Kugellager-Zeitschrift", published in Germany in April 1972.

The known wheel bearing unit has an outer ring with several flange-like shaped parts, each of which have boreholes through which screw bolts are inserted. The screw bolts serve to fasten the outer ring to a connecting part provided on a vehicle. The known wheel bearing unit furthermore includes an inner ring with corresponding outer parts to which a wheel hub and a brake disk are fastened. This wheel bearing unit is completely proven in use. However, the form of construction of the outer ring requires a relatively compact connecting part with respect to the vehicle, since the screw bolts, required for attachment, must have a certain free extension length for the strength required. Furthermore, the screw bolts cannot be installed in the outer ring with a so-called impact screw inserter since the installation conditions in the area of the wheel hanging are usually relatively confined. This is particularly true for wheels which are connected with a drive. The manufacture of the outer ring is also relatively difficult, since very close tolerances are prescribed by the vehicle manufacturers for the threaded holes in the flange-like outer parts of the rings, especially with respect to the diameter, the inclination and the pitch diameter of the holes. In order to maintain these close tolerances, it is therefore necessary to manufacture the outer ring out of a case-hardened steel, since the threaded holes cannot be worked into the ring in its hardened state. One approach is to bore core holes into the ring in a prehardened state. During hardening, these core holes are then covered so that these regions remain soft for working in the thread. However, the danger that exists with the foregoing technique is that the core holes become distorted during hardening, and the close tolerances can thus be maintained only with difficulty.

SUMMARY OF THE INVENTION

It is therefore the prime object of the present invention to provide an improved wheel bearing construction overcoming the disadvantages of the known bearings described above.

In accordance with the invention, the problem is solved and the object achieved by providing the outer portion of the bearing part attached to the vehicle with an essentially axially running thread screwed into a corresponding thread of a connecting part provided on the vehicle, this bolt connection being secured against becoming loose automatically.

A particularly desirable bolt connection is obtained, in accordance with a further refinement of the invention, if this pairing consists of a slightly conical outer thread and a cylindrical inner thread, or the reverse. In order to prevent an automatic loosening of the bolt connection, it is furthermore advantageous to provide the bolt connection be secured by at least one set screw, which is arranged in the connecting part provided in the vehicle and which abuts with one of its ends against a disk of soft metal pressed into the thread of the outer portion of the bearing part that is screwed into the connecting part. Alternatively, the bolt connection is secured by at least one clamping unit formed in the area of the thread of the connecting part by a slit, that slit being pressed together by means of a tightening screw. According to a further characteristic of the invention, it may be advantageous, in providing a simple method for preventing turning, to provide the outer portion of the bearing part fastened to the vehicle with a left thread or a right thread, depending on the arrangement of the bearing unit on the vehicle. In order to simplify the assembly, it is advantageous, in accordance with a further feature of the invention, to provide the bearing part carrying the thread with several recesses for bolting the bearing part tightly to the connecting part. These recesses appropriately are always boreholes, bored into the bearing parts in their prehardened state. Finally, from the point of view of maintaining close tolerances, it is particularly advantageous that the outer portion of the bearing part, intended for the connecting part on the vehicle, has a thread that is fully cut into the bearing part in its hardened state.

It is noted that it is a known procedure, in the case of a bevel gear, to provide the inner and/or outer rings of the bevel gear roll body with a thread in order to make it possible to axially adjust and fix the roll body, these rings being secured by a hardenable binder (German Patent Disclosure No. 1,575,734). However, ball races with thread as provided there fulfill a different function and, by their construction, are not suitable for a wheel bearing unit.

The advantages achieved with the present invention are particularly evident since the wheel bearing can easily be installed. This is due to the bolt connection between the bearing part, representing the outer ring, and the connecting part on the vehicle. This attachment of the wheel bearing to the vehicle, simple yet safe under operating conditions, is insured by the particularly favorable form and arrangement of both the thread and the means for securing the bolt connection, as described above. These measures described further provide that the connecting part on the vehicle can be constructed of relatively small size. Also, the thread of the corresponding bearing part can easily be produced with relatively close tolerances by conventional cutting procedures. Finally, the inventive construction makes it possible that conventional ball and roller bearing steel can be used, in contrast to the known constructions for which a case hardened steel must be used.

The foregoing description as well as further objects and advantages will become more evident from the following particulars of the invention, illustrated in greater detail and described by means of a preferred embodiment of construction of a wheel bearing unit.

DESCRIPTION OF THE DRAWINGS

The sole FIGURE illustrates the construction of a wheel bearing unit in accordance with the invention, drawn schematically and shown in section.

DETAILED DESCRIPTION

The wheel bearing unit, shown in section in the drawing, has two bearing parts 1 and 2 which respectively represent an inner ring and an outer ring of the roll body. The bearing parts 1 and 2 consist of a hardened ball bearing steel. To make the distinction clearer, the bearing parts are named in the following only as inner ring 1 and outer ring 2. The inner ring 1 has a cross-section that is approximately L shaped and is constructed in one piece of a ball race 3 and a flange-like outer part 4. A brake disk 5 and a wheel rim 6 are connected to the outer part 4 of the inner ring 1 by screw bolts 7. The outer ring 2 also has a cross-section that is approximately L shaped and is constructed in one piece of a ball race 8 and a flange-like outer part 9. The outer part 8 has an axially running male screw thread 10, that is mated with (screwed into) a female screw thread 11 of a connecting means such as the part 12, shown here as a swivel bearing, and which is in turn connected to the vehicle. The male thread 10 is cut into the outer ring 2 after the latter has been hardened. In addition, the outer part 8 has several recesses 13, used for screwing on the outer ring 2 tightly. In every case, the recesses 13 are drilled into the outer ring 2, while it is in its prehardened state.

Between the inner and outer rings 1 and 2, there are rolling bodies 14. In the form of construction shown, these rolling bodies 14, together with ball races 3 and 8, form a double row, angular contact ball bearing. The inner ring 1 is attached to the axle journal of a synchronizing joint 15 of the drive (not shown) for the vehicle. It is also possible to use the wheel bearing unit of the present invention for a wheel that is not driven. The internal space of the bearing is sealed through particularly formed sealing means 16 and 17.

The bolt connection, formed by pairing of the male and female connections 10, 11, is secured by safety devices against becoming loose automatically. Two different possibilities are shown in the drawings. A first possible safety device is shown in the upper area of the bolt connection. Here, in the connecting part 12, a set screw 18 is positioned with its lower end resting against a disk 19 of soft metal, such as soft copper or the like, which is pressed into the male thread 10 of the outer ring 2. A second possible safety device is shown in the lower area of the bolt connection in the form of a clamping unit 21. The clamping unit 21 is formed by a radial slit 23 in the area of the female screw thread 11 of the connecting piece 12. The radial slit 23 can be pressed together by means of a tightening screw 22. It is also possible to construct the male screw thread 10 somewhat tapered (not shown in the drawing) and the female thread cylindrical, thereby offering a further possible way of securing the bolt connection against becoming loose automatically. Here, with this type of pairing, the thread profiles wedge together. Obviously, a reverse pairing, with the male thread cylindrical and the female thread slightly tapered, is also possible. Furthermore, the various safety devices shown may be combined. Finally, it is also possible, depending on the arrangement of the bearing unit in the vehicle, to form the female threads 11 and the male threads 10 as left or right threads. In this case, depending on the main direction of rotation of the wheel, a further and very simple method for preventing rotation is obtained.

Further variations, modifications, omissions and additions within the spirit and scope of the present invention will be apparent to those skilled in the art.

What is claimed is:

1. In a wheel bearing unit for motor vehicles with two bearing parts which can rotate relative to one another, between which at least two rows of rolling elements are arranged, said bearing parts each having an outer flange-like portion, a first of said outer portions being fastened to said vehicle, the other of said outer portions being fastened to said wheel, the improvement comprising a screw thread formed on an outer periphery of said first of said outer portions and running essentially axially, connecting means for connecting said first of said outer portions to said vehicle, said connecting means having a corresponding screw thread mating with the screw thread formed on said first of said outer portions, whereby said first outer portion may be affixed to said connecting means by relative rotation therebetween, and means for securing said mated connection against becoming loose.

2. The wheel bearing unit of claim 1, wherein said mated connection is a pairing of a slightly tapered male and a cylindrical female thread.

3. The wheel bearing unit of claim 1, wherein said mated connection is secured by at least one set screw located in said connecting means, one end of said set screw lying against a disk of soft metal which is pressed into the screw thread of said first outer portion of the corresponding bearing part.

4. The wheel bearing unit of claim 1, wherein said mated connection is secured by at least one clamping unit formed in the area of the screw thread of said connecting means by a radial slit and screw tightening means for pressing said radial slit together.

5. The wheel bearing unit of claim 1, wherein said securing means is provided by the corresponding first outer portion of said bearing part being fastened to said vehicle by screw threads which act oppositely to the loosening of said parts relative to one another.

6. The wheel bearing unit of claim 1, wherein the bearing part provided with said screw thread includes several recesses permitting said bearing part to be tightly secured to said connecting means.

7. The wheel bearing unit of claim 1, wherein said first outer portion of the bearing part mated with said connecting means on said vehicle is provided with said screw thread fully cut while said bearing part is in the hardened state.

8. The wheel bearing unit of claim 1 wherein said mated connection is a pairing of a slightly tapered female and a cylindrical male thread.

* * * * *